United States Patent [19]

Bronoel et al.

[11] Patent Number: 5,334,465
[45] Date of Patent: Aug. 2, 1994

[54] METHOD OF MAKING CADMIUM ELECTRODES FOR ALKALINE BATTERIES

[75] Inventors: Guy Bronoel, Versailles; Thierry Potier, Neuilly-Sur-Marne; Noëlle Tassin, Fontenay-Sous-Bois; Bernard Bugnet, Saint-Genis-Pouilly; Denis Doniat, Le Perreux; Robert Rouget, Paris, all of France

[73] Assignee: Sorapec S.A., Fontenay-Sous-Bois, France

[21] Appl. No.: 113,260

[22] Filed: Aug. 30, 1993

Related U.S. Application Data

[62] Division of Ser. No. 817,499, Jan. 7, 1992, Pat. No. 5,264,309.

[30] Foreign Application Priority Data

Jan. 10, 1991 [FR] France .................................. 91 00394

[51] Int. Cl.$^5$ .......................... H01M 4/44; H01M 4/58
[52] U.S. Cl. ..................................... 429/222; 429/223; 252/182.1
[58] Field of Search .............................. 429/222, 223; 252/182.1

[56] References Cited

U.S. PATENT DOCUMENTS 5,244,758  9/1993  Bronoel et al. ..................... 429/223

FOREIGN PATENT DOCUMENTS

| 0185830 | 7/1986 | European Pat. Off. . |
|---|---|---|
| 33525 | 11/1885 | Fed. Rep. of Germany . |
| 1087590 | 2/1955 | France . |
| 2066850 | 8/1971 | France . |
| 252924 | 12/1987 | German Democratic Rep. . |
| 58-198856 | 11/1983 | Japan . |
| 60-258854 | 12/1985 | Japan . |
| 862092 | 3/1961 | United Kingdom . |

OTHER PUBLICATIONS

Chemical Abstracts, vol. 100, No. 16, Apr. 16, 1984, Abstract No. 1241450, "Cadmium Anodes for Secondary Alkaline Batteries."

Chemical Abstracts, vol. 104, No. 18, May 5, 1986, Abstract No. 152492R, "Manufacture of paste-type Cadmium Anode."

V. Negeevich et al., Vopr. Khim. Khim. Technol. 87, (1988), 6–11, "Effect of Nickel Compounds on the Electrochemical Behavior of a Cadmium Electrode."

*Primary Examiner*—John S. Maples
*Attorney, Agent, or Firm*—Sandler, Greenblum & Bernstein

[57] ABSTRACT

The cadmium negative electrode has a structure serving as a collector and made of nickel foam. The sponge is filled with a mixture cons mainly of cadmium oxide and contains nickel sulphate hexahydrate in the proportion of 1.8 to 2.7% by weight of the total mixture, expressed in the form of nickel.

9 Claims, No Drawings

METHOD OF MAKING CADMIUM ELECTRODES FOR ALKALINE BATTERIES

This application is a division of application No. 07/817,499, filed Jan. 7, 1992, now U.S. Pat. No. 5,264,309.

BACKGROUND OF THE INVENTION

1. Field of the Invention

The invention relates to a cadmium electrode for alkaline batteries and to a method of manufacturing the aforementioned electrodes.

2. Discussion of Background Information

Cadmium electrodes for batteries are at present made by two main methods. In the first method, a sintered nickel substrate is impregnated with cadmium hydroxide $Cd(OH)_2$ by chemical means (precipitation). In the second and more recent method, a mixture of cadmium oxide $CdO$ + binder is deposited on a metal substrate, which is usually a reeled-out piece or strip of perforated nickel-plated steel.

In recent years, cellular metal structures, e.g. of foamed nickel, have become commercially available, and have accordingly been used as collectors, into which the mixture of $CdO$ + binder is introduced. It might be expected that these structures would facilitate drainage of charges into the active material, thus increasing the capacitive efficiency of the $CdO$ material constituting the electrode.

In this connection, it has been known for more than five years that addition of nickel to the mixture of $CdO$ + binder has an advantageous effect on efficiency.

In most of the articles, mostly Soviet, published on this subject, nickel is introduced in the form of metal powder or nickel hydroxide. The possibility of introducing nickel in the form of sulphate or nitrate is mentioned in only one publication, by V. M. Negeevich, G. L. Marchenko, L. N. Sagoyen and V. D. Kushkov in Vopr. Khim. Khim. . 87, (1988), 6–11. With a view to obtaining maximum efficiency, these authors have defined an $Ni(OH)_2/CdO$ ratio of 0.08. In their tests, the ratios were between 0.01 and 0.15.

As far as the applicants know, however, the aforementioned authors did not work with foamed nickel substrates.

SUMMARY OF THE INVENTION AND DETAILED DESCRIPTION

Accordingly, it is assured that the optimum $Ni(OH)_2/CdO$ ratio with regard to efficiency must depend on the structure of the collector on to or into which the active material is introduced. In the case where a nickel foam collector is used, it would be expected that the weight of nickel to be added to the $CdO$ would be less than that necessary to obtain maximum capacitive efficiency compared to when the collector is a perforated strip or a reeled out member. The applicants have found that in reality the interactions were not as simple as would appear at first sight.

The cost of the negative electrode depends closely on the weight of nickel added to the $CdO$ and the form in which the nickel is introduced.

For example, it is known from EP-A-0 185 830 (Sorapec) to add nickel in the form of nickel nitrate. Likewise, GB-A- 862 092 (VEB Grübenlampenwerke) describes addition of nickel in sulphate form but in very small quantities, approximately 0.1 to 3% by weight expressed in the form of Ni.

With regard to this double aim of efficiency and low cost, the proposed invention relates to a cadmium negative electrode for alkaline batteries, in which the structure serving as a collector is a nickel foam. The nickel foam is filled with a mixture consisting mainly of cadmium oxide and contains nickel sulphate, preferably in the form of nickel sulphate hexahydrate. The amounts of nickel are larger than stated hereinbefore, i.e. between 1.8 and 2.7% by weight of the total mixture, equivalent e.g. to 8 to 12% by weight when expressed in the form of nickel sulphate hexahydrate.

Advantageously, the electrode also contains methyl cellulose, e.g. between 0.5 and 2% by weight of the total mixture, and a binder such as polytetrafluoroethylene, in the proportion e.g. of 2 to 5% by weight of the total mixture.

The content of nickel sulphate in the form of sulphate hexahydrate is preferably between 8 and 12% by weight of cadmium oxide or of the total cadmium oxide + methyl cellulose + binder.

Preferably also, the nickel foam serving as a collector has cells with an average diameter between 0.1 and 0.5 mm.

Based on the use of an aforementioned cellular collector, the cell dimension of which is more traditionally defined by the number of cells per inch, i.e. 45 (ppi 45), the following conclusions can be drawn from a determination of:

The nature of the Ni compound to be introduced into $CdO$,

The range of proportions of this compound for obtaining maximum efficiency and

The method of introducing this compound.

First, for a given content of metallic Ni, the efficiency as regards $CdO$ is the same when using powdered $Ni(OH)_2$ or metallic nickel powder (particle size about 3 micrometres). On the other hand, for a given content of Ni, the efficiency is higher in the case where nickel is introduced in the form of sulphate. For example, in the case of a 10.6% content of sulphate (relative to the weight of $CdO$), i.e. 2.4% of metallic nickel, the efficiency is 90% whereas addition of 2.4% nickel powder or 3.7% of $Ni(OH)_2$ (i.e. 2.4% Ni) gives an efficiency of only 60%.

Second, in the case where nickel sulphate is used, the efficiency does not increase when the content of sulphate is greater than 10% relative to $CdO$ +3% of PTFE (binder) +1% methyl cellulose. At this level, the efficiency as regards $CdO$ is 90%, whereas when the nickel sulphate content is 3 to 4%, the efficiency is only about 70%.

Finally, inter alia in the case of electrodes having the highest surface capacity (i.e. the thickest, since these have the highest quantity of $CdO$ per $cm^2$ of surface area), better results were obtained when nickel sulphate was introduced in a mixture in the paste before the paste was deposited on the substrate.

Accordingly, another feature of the invention relates to a method of manufacturing a cadmium D negative electrode as defined hereinbefore, and consists in mixing the nickel sulphate with the paste comprising the cadmium oxide and optionally comprising the binder and the methyl cellulose, before filling the nickel foam, e.g. by forming a paste.

The invention will be more clearly understood with reference to the accompanying example, given by way of non-limitative illustration only.

EXAMPLE

A mixture was prepared comprising (by weight) 87.3% CdO, 2.7% polytetrafluoroethylene (PTFE) in the form of a 30 N (60%) suspension sold by DUPONT DE NEMOURS, the weight of PTFE being expressed in dry extract, 0.9% methyl cellulose and 9.1% nickel sulphate in the form of a 440 g/l solution (the weight is expressed in $NiSO_4,6H_2O$), i.e. 2.04% expressed in the form of Ni.

The mixture, after being suitably converted into fibrils, was formed into a paste with a Metapore type nickel foam sold by Messrs EPCI, ppi 45 and having a thickness between 0.5 and 3 mm, depending on the desired surface capacitance of the electrode.

The electrode had excellent efficiency, at least 90%.

COMPARATIVE EXAMPLE

The procedure was the same as in the previous example except that nickel nitrate was used instead of nickel sulphate. As described in the cited EP-A-0 185 830, nickel nitrate was added by immersion after forming the electrode.

The capacitive efficiency obtained with respect to CdO was only 80% instead of 90%.

What is claimed is:

1. Method of manufacturing a cadmium negative electrode, comprising:
   preparing a mixture comprising cadmium oxide and between 8 to 12% nickel sulphate hexahydrate; and
   filling a nickel foam with said mixture.
2. The method according to claim 1, wherein said nickel foam comprises cells having an average diameter between 0.1 and 0.5 mm.
3. The method according to claim 1, wherein the mixture further comprises polytetrafluoroethylene.
4. The method according to claim 1, wherein the mixture further comprises methyl cellulose.
5. The method according to claim 1, wherein the mixture further comprises polytetrafluoroethylene and methyl cellulose.
6. The method according to claim 3, wherein the mixture comprises about 2 to 5% polytetrafluoroethylene by weight of mixture.
7. The method according to claim 4, wherein the mixture comprises between 0.5 to 2% methyl cellulose by weight of the mixture.
8. The method according to claim 2, wherein the mixture comprises between 2 to 5% polytetrafluoroethylene by weight of the mixture and between 0.5 to 2% methyl cellulose by weight of the mixture.
9. The method according to claim 5, wherein the mixture comprises between 2 to 5% polytetrafluoroethylene by weight of the mixture and between 0.5 to 2% methyl cellulose by weight of the mixture.

* * * * *